United States Patent [19]

Lee et al.

[11] Patent Number: 5,617,385
[45] Date of Patent: Apr. 1, 1997

[54] COMPACT DISK AND HIGH-SPEED SEARCH METHOD THEREOF AND RECORDING METHOD APPROPRIATE THEREFOR

[75] Inventors: Deok-hyun Lee, Seoul; Gyoung-chan Park, Suwon; Won-jae You, Incheon; Jae-yong Kang, Suwon, all of Rep. of Korea

[73] Assignee: Samsung Electronics Co., Ltd., Kyungki-do, Rep. of Korea

[21] Appl. No.: 471,683

[22] Filed: Jun. 6, 1995

[30] Foreign Application Priority Data

Jun. 21, 1994 [KR] Rep. of Korea ............... 94-14031
Dec. 28, 1994 [KR] Rep. of Korea ............... 94-382269

[51] Int. Cl.⁶ ................................................. G11B 17/22
[52] U.S. Cl. .................... 369/32; 369/275.3; 369/47
[58] Field of Search ........................... 369/32, 33, 47, 369/48, 275.3, 58, 54

[56] References Cited

U.S. PATENT DOCUMENTS

| | | | |
|---|---|---|---|
| 5,173,888 | 12/1992 | An | 369/33 |
| 5,367,510 | 11/1994 | Ando | 369/32 |
| 5,408,449 | 4/1995 | Oh | 369/32 |
| 5,446,714 | 8/1995 | Yoshio et al. | 369/32 |

*Primary Examiner*—Tan Dinh
*Attorney, Agent, or Firm*—Sughrue, Mion, Zinn, Macpeak & Seas

[57] ABSTRACT

A compact disk, a high-speed searching method of the compact disk, and a recording method which corresponds to the high-speed searching method is provided. The compact disk includes a lead-in area and e program area. The lead-in area contains table-of-contents information which includes the number of recording tracks recorded on the disk and address information relating to each track. The program area contains index-table information which includes index numbers and starting addresses for a plurality of programs recorded on the disk. Furthermore, the plurality of programs are recorded in the program area according to its corresponding index number. Specifically, the programs are recorded from the innermost circumference to the outermost circumference of the disk in a tree structure based on the index numbers. By recording programs on the compact disk in the above order, a search through several thousands of song programs can be performed at high speed by gradually decreasing the distance in which an optical pickup device moves as the number of digits relating to the indexed addresses of the programs are increasingly input.

13 Claims, 5 Drawing Sheets

| FRAME No. | PNT | PM | PS | PF |
|---|---|---|---|---|
| n<br>n+1<br>n+2 | 01<br>01<br>01 | 00 | START ADDRESS OF FIRST PMA TRACK<br>02　　　　32 | |
| n+3<br>n+4<br>n+5 | A0<br>A0<br>A0 | FIRST TRACK NUMBER | 00 | 00 |
| n+6<br>n+7<br>n+8 | A1<br>A1<br>A1 | LAST TRACK NUMBER | 00 | 00 |
| n+9<br>n+10<br>n+11 | A2<br>A2<br>A2 | LOA START ADDRESS | | |

| INDEX | M | S | F | GR | |
|---|---|---|---|---|---|
| 0 0 0 0 | 00 | 02 | 47 | 00 | |
| 0 0 0 1 | 00 | 03 | 40 | 01 | |
| 0 0 0 2 | 6A | 04 | 41 | 01 | G1 |
| 0 0 0 3 | 7B | 05 | 36 | 01 | |
| 0 0 0 4 | 8E | 06 | 19 | 01 | |
| 0 0 0 5 | 8A | 07 | 12 | 01 | |
| 0 0 0 6 | 8B | 08 | 05 | 00 | |
| 0 0 0 7 | 8C | 09 | 02 | 01 | G2 |
| 0 0 0 8 | 8D | 10 | 10 | 01 | |
| 0 0 0 9 | 8E | 14 | 00 | 01 | |
| ⋮ | ⋮ | ⋮ | ⋮ | ⋮ | |
| 3 9 9 9 | XX | XX | XX | 01 | |

Column headers: 42 INDEX, 44 M S F, 46 GR

| INDEX | M | S | F | GR |
|---|---|---|---|---|
| 0 0 0 0 | E0 | 00 | 00 | 11 |
| 0 0 0 1 | E0 | 04 | 02 | 12 |
| 0 0 0 2 | E1 | 08 | 12 | 32 |
| 0 0 0 3 | E2 | 0C | 1A | 43 |
| 0 0 0 4 | E3 | 0F | 32 | 53 |
| 0 0 0 5 | E4 | 11 | 0B | 02 |
| 0 0 0 6 | E5 | 15 | 82 | 03 |
| 0 0 0 7 | E6 | 1A | 73 | 04 |
| 0 0 0 8 | E7 | 20 | 09 | 05 |
| 0 0 0 9 | E8 | 26 | C6 | 06 |
| ⋮ | ⋮ | ⋮ | ⋮ | ⋮ |
| 3 9 9 9 | XX | XX | XX | 01 |

| U\D | 0 | 1 | 2 | 3 | 4 | 5 | 6 | 7 | 8 | 9 |
|---|---|---|---|---|---|---|---|---|---|---|
| 0 | | | FOLK SONG | KIDS' SONG | POP SONG | CAROL | ARMY SONG | THEME SONG | ETC. | |
| 1 (DANCE1) | | PRE '70 | '70~'90 | POST '90 | | | | | | |
| 2 (DANCE2) | | " | " | " | | | | | | |
| 3 (TROT) | | " | " | " | | | | | | |
| 4 (NEW TROT) | | " | " | " | | | | | | |
| 5 (BALLAD1) | | " | " | " | | | | | | |
| 6 (BALLAD2) | | " | " | " | | | | | | |
| 7 | ETC. | " | " | " | | | | | | |
| 8 | | | | | | | | | | |
| 9 | | | | | | | | | | |

COMPACT DISK AND HIGH-SPEED SEARCH METHOD THEREOF AND RECORDING METHOD APPROPRIATE THEREFOR

FIELD OF THE INVENTION

The present invention relates to a compact disk, a high-speed search method of the compact disk, and a recording method which corresponds to the high-speed search method. More particularly, the present invention relates to a compact disk and search method which enables high-speed searching of a program recorded on the compact disk by gradually decreasing the distance in which an optical pickup device moves as the number of digits relating to the indexed address are increasingly input.

BACKGROUND OF THE INVENTION

A video-song accompaniment apparatus is a device which displays lyrics and background images as a musical program is being reproduced. As a result, a user can enjoy singing along with the musical program while viewing the displayed lyrics. Recently, the inventor of the present invention has developed a compact disk which is used in a video-song accompaniment apparatus and which can store about 2,000 musical programs and 4,000 still images. (Such a compact is typically referred to as a CD-karaoke disk or CDK disk). Furthermore, the inventor has developed a video-song accompaniment apparatus for reproducing CDK disks.

An ordinary compact disk generally comprises a lead-in area and program area. The lead in area typically contains a table of contents (i.e. an index) of all of the programs recorded on the disk, and the program area is the portion of the disk on which the programs are stored. However, in a CDK disk, the table of contents in the lead in area is not large enough to store indexing information relating to the thousands of musical programs and still images. Therefore, an index table is recorded in the program area of the CDK disk so that the many musical programs and still images can be indexed and addressed. If the CDK disk has 2,000 musical programs, each listing of an index of all of the musical programs requires at least four decimal digits.

In order to reproduce a particular musical program, a user must sequentially enter digits relating to the index number of the program via an input device. Accordingly, the time necessary to reproduce a selected program from a CDK disk depends upon the length of time between each digit input by the user. Assuming that an interval between each digit input by a typical user is about 0.3 seconds, the time required to reproduce a musical program can be estimated as follows.

The amount of musical data for each program recorded in the CDK disk is about 50 Kb, and one sector of the CDK disk can store about 2.3 Kb. Since a CD player can read about 75 sectors per second, the time for transferring the musical data from a disk to a CDK decoder is about 0.29 seconds. Thus, after the index number of a musical program is input, the user generally waits about 0.59 seconds for the CD player to begin reproducing the selected musical program (i.e. 0.3 seconds for inputting a reproduction key and 0.29 seconds for transferring the musical data to the CDK decoder).

SUMMARY OF THE INVENTION

It is one object of the present invention to provide a search method which can search a program at high speed and thus decrease the overall playback time of a compact disk in which a plurality of programs, each of which has an index number, are recorded.

It is another object of the present invention to provide a compact disk which can reduce a search time for a program recorded therein.

It is a third object of the present invention to provide a recording method appropriate for the compact disk.

To achieve the first object described above, there is provided a method for reproducing a selected program of a plurality of programs recorded on a compact disk, wherein an index table having index numbers and starting addresses corresponding to said plurality of programs is also recorded on said compact disk. The method comprises the steps of: inputting an input number; creating a temporary index number by combining said input number and any other previously input numbers; reading said index table to obtain a starting address of a program which corresponds to said temporary index number; reading said program corresponding to said temporary index number; storing said program in a temporary memory; repeating the steps of inputting an input number, creating a temporary index number, reading said index table, reading said program, and storing said program until a reproduction command is input.

To achieve the second object, there is provided a compact disk on which a plurality of programs are recorded. The compact disk comprises: a lead-in area on which table-of-content information is recorded, wherein said table-of-content information comprises information of a plurality of recording tracks and address information of each of said recording tracks; a program area on which index-table information is recorded on an innermost circumference of said compact disk, wherein said index-table information comprises index numbers and starting addresses of a plurality of programs recorded in said program area and wherein said plurality of programs are sequentially recorded in a direction from said innermost circumference to an outermost circumference of said compact disk in a tree structure based on said index numbers of said plurality of programs; and a lead-out area on which termination information of a recording area is recorded.

To achieve the third object, there is provided a method of recording a plurality of programs on a compact disk to enable high-speed searching of said plurality of programs. The method comprises the steps of: respectively assigning index numbers to said plurality of programs; arranging said index numbers in a tree structure; rearranging said plurality of programs into rearranged programs, wherein said rearranged programs are rearranged according to an order of searching said tree structure; obtaining starting addresses for said rearranged programs; creating an index table using said starting addresses and said index numbers of said rearranged programs; and recording said index table and said arranged programs sequentially from an innermost circumference to an outermost circumference on a program area of said compact disk.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
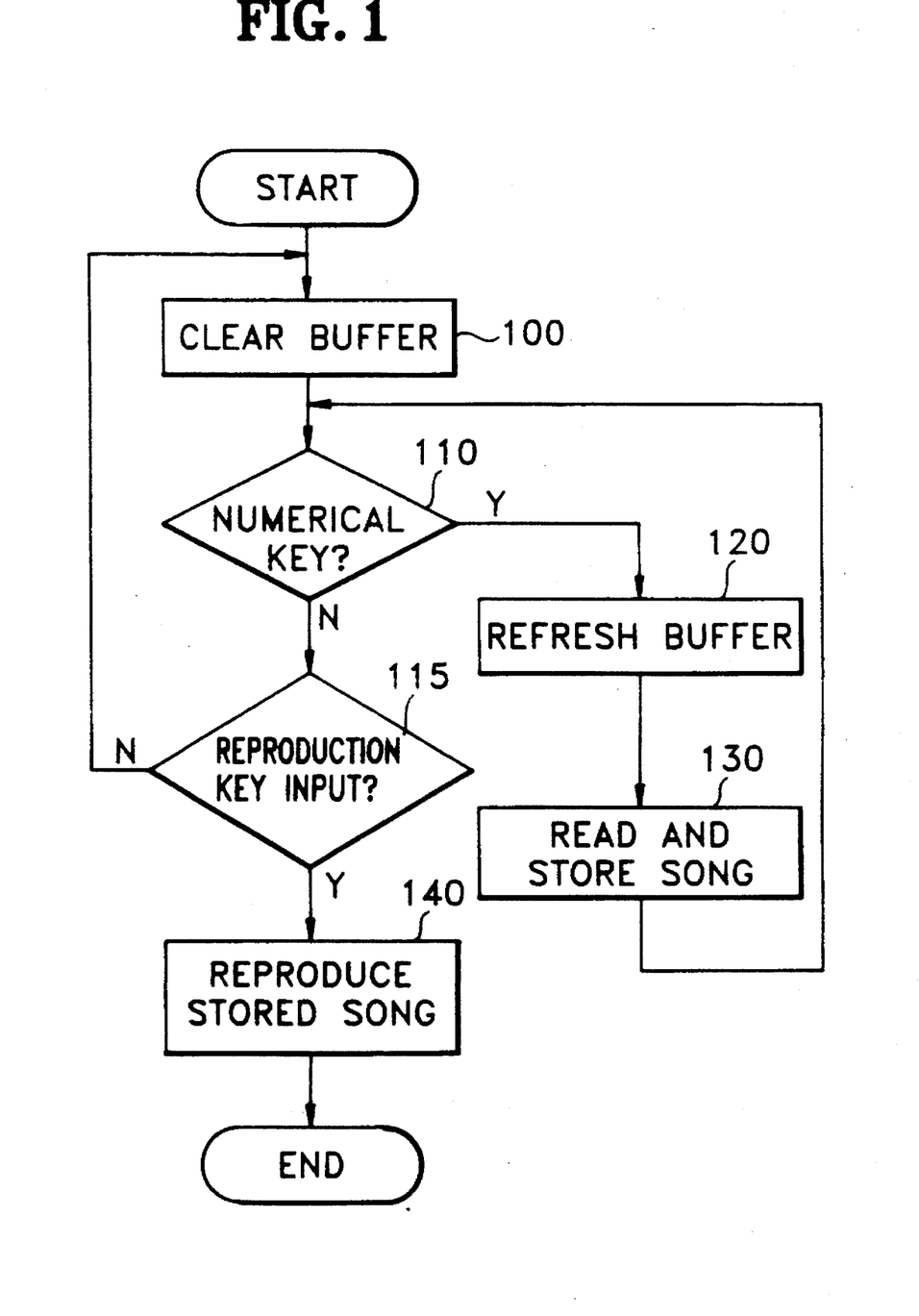
FIG. 1 is a flow chart for explaining a high-speed search method of a compact disk according to the present invention.

FIG. 1 is a flow chart illustrating a method for searching for a selected musical program according to one embodiment of the present invention. In the figure, it is assumed that a user inputs a 4-digit index number relating to a particular musical program by utilizing numerical keys of an input device of a video-song accompaniment apparatus.

As shown in step 100, when the search method is initiated, a buffer which stores the index number is initialized so that any previously entered index number is erased. Subsequently, the method determines whether or not the user has selected a numerical key on the input device. (Step 110). If a numerical key has not been input, the method determines whether or not a reproduction key has been depressed on the input device. (Step 115). If the reproduction key has not been selected, steps 100 and 110 are executed again. On the other hand, if the reproduction key has been selected at step 115, the CD player reproduces the musical program which corresponds to the index number stored in the buffer. (Step 140).

If a numerical key is selected at step 110, the selected number is stored in the buffer. (Step 120). Specifically, all of the numbers previously stored in the buffer are respectively shifted to the next highest significant digit locations, and the currently input number is stored in the least significant digit location. For example, if the number "3" has been previously stored in the buffer and the number "2" is subsequently input, the number stored in the buffer is the number "32".

After each number is stored in the buffer, a pickup device moves to the location of the recording medium designated by the index number currently stored in the buffer and reads the musical data from such location. Subsequently, the musical data is stored in a temporary memory. (Step 130). Afterwards, the method returns to step 110.

For example, after the buffer is cleared (step 100), if the user inputs the number "2" via the input device (step 110), the number "2" is stored in the buffer (step 120). Consequently the buffer contains the number "0002" the optical pickup moves to the location of the CDK disk which contains musical data relating to the index number "2", and the corresponding musical data is stored in the temporary memory. (Step 130).

Subsequently, if the user inputs the number "3" (step 110), the number "3" is stored in the buffer (step 120). Thus, the buffer contains the number "0023" the optical pickup moves to the location of the CDK disk which contains musical data relating to the index number "23", and the corresponding musical data is stored in the temporary memory. (Step 130).

Subsequently, if a numerical key is not input at step 110, the method determines if the reproduction key is input. (Step 115). If the reproduction key is input, the musical data stored in the temporary memory (i.e. the musical data relating to the index number "23") is reproduced.

In the search method described above, song accompaniment information corresponding to the index number of the musical data is also read from the recording medium and stored in a temporary memory. Thus, the accompaniment information is output together with the musical data stored in the temporary memory when the user presses a reproduction key. As a result, the delay time between the instant that a particular musical program is selected and the instant that the musical program and song accompaniment information is reproduced is minimized.

Figure 2:
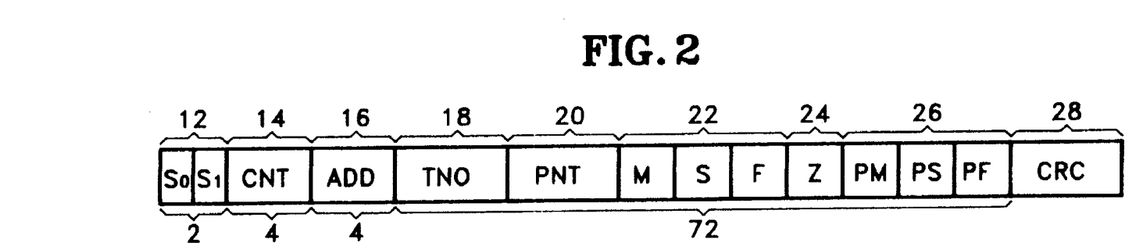
FIG. 2 is a view showing the data constitution of a Q subcode channel of a compact disk.

The CDK disks used in the video-song accompaniment apparatus generally contain a lead-in area (LIA), a program area (PMA), and a lead-out area (LOA). The lead-in area of one embodiment of a CDK disk of the present invention is shown in FIG. 2. As shown in the figure, lead-in area has a Q-channel data structure comprising has 98 second channel bits allocated among eight channels P, Q, R, S, T, U, V and W of 98 frames.

The first two bits 12 are synchronous bits S0 and S1, and the remaining data area of the Q-channel data structure contains 96 bits. In particular, the Q-channel data structure includes four control bits (CNT) 14, four address bits (ADD) 16, and seventy-two data bits 18, 20, 22, 24, and 26. The seventy-two data bits include eight bits of a track number code (TNO) 18, eight bits of a pointer (PNT) 20, twenty-four bits of an address (minute (M), second (S), frame (F)) 22, eight interval bits (Z) 24, and twenty-four bits of a pointer address (PM, PS, PF) 26. The seventy-two data bits are followed by a 16-bit CRC code 28.

In the lead-in area, the decimal number "00" represents the track number code (TNO) of the Q channel and the table of contents recorded on the disk. The table of contents includes the pointer 20 and the pointer addresses 26 of the Q channel. The pointer addresses 26 represent the value of minute (M), second (S), and frame (F) of the starting point of each track of the program area (PMA) of the CDK disk.

Figure 3:
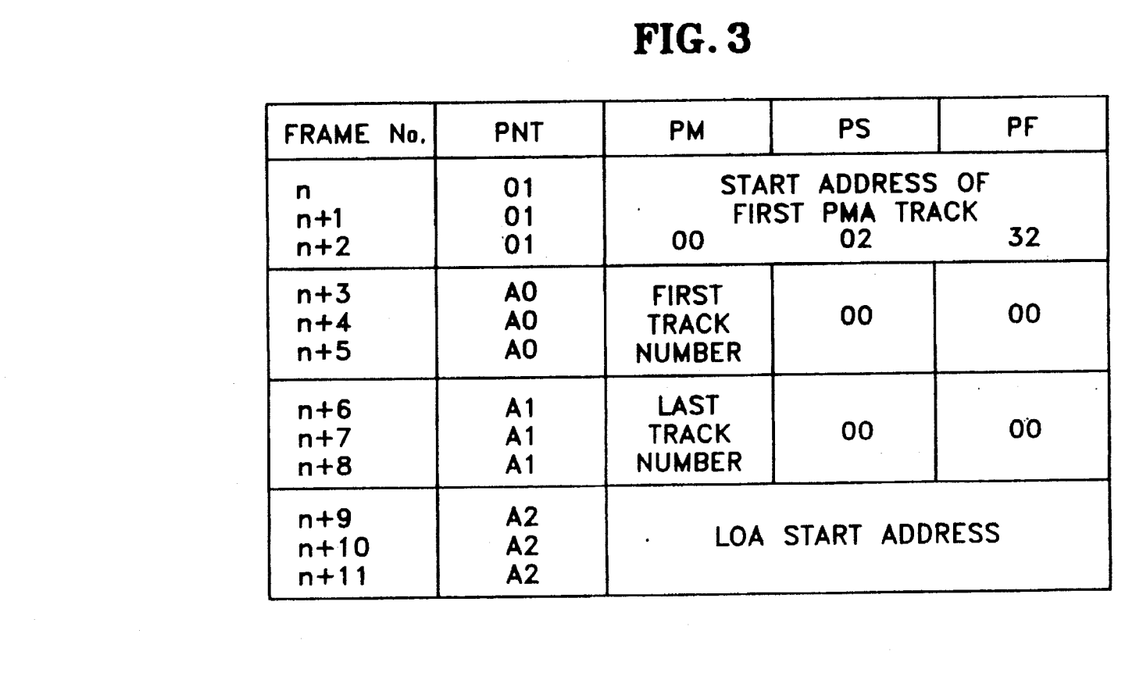
FIG. 3 is a view showing an example of the table of contents of a Q subcode channel in a compact disk according to the present invention.

FIG. 3 shows an example of a table of contents according to the present invention. As shown in the figure, if the pointer 20 contains the number "01h", the pointer address 26 indicates the starting address of the first track of the program area (PMA). If the pointer 20 contains the number "A0h", the PM portion of the pointer address 26 indicates the first track number of the program area (PMA). If the pointer 20 contains the number "A1h", the PM portion of the pointer address indicates the last track number of the program area (PMA). Finally, if the pointer value is "A2h" the pointer address 26 indicates the starting address of the lead-out area. In the example described above, the program area (PMA) contains one track of data. Accordingly, the values of the pointers A0h and A1h listed in the table of contents are the same.

Figures 4, 5:
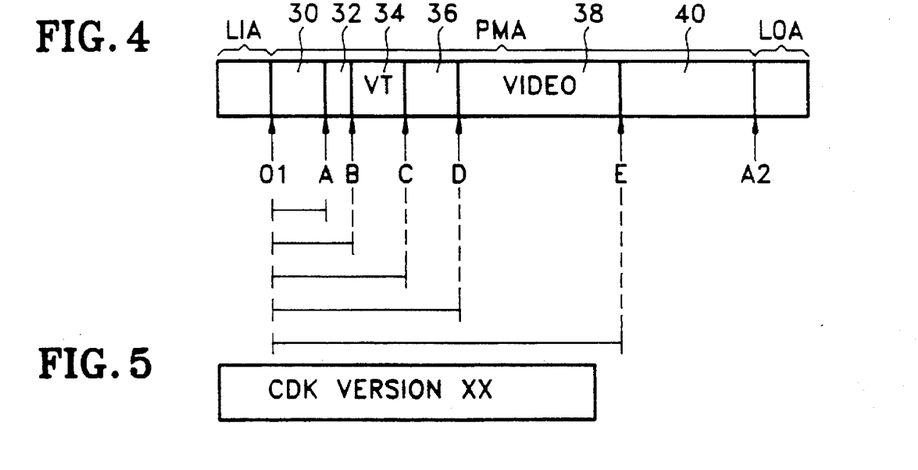
FIG. 4 is a view for explaining the format of a program area in the compact disk according to the present invention.
FIG. 5 is a view showing an example of a disk explaining format recorded on the disk area shown in FIG. 4.

FIG. 4 illustrates an embodiment of the program area PMA. As shown in the figure, the program area (PMA) comprises a disk label area 30, a disk explaining area 32, a first table area (VT) 34, a second table area 36, a first data area (VIDEO) 38, and a second data area 40. Furthermore, between the second data area 40 and the lead-out area, at least one CD-DA track may be included. In such case, an additional pointer and address of the CD-DA track are included in the table of contents in the lead-in area. Moreover, in this embodiment, the disk label area 30 adopts the well-known ISO 9660 format.

The disk explaining area 32 is shown in FIG. 5. As shown in the figure, the disk explaining area 32 has an absolute address A, which represents a predetermined time interval from 00 minutes, 00 seconds, and 00 frames of the starting address of the program area (PMA). Furthermore, the disk explaining area 32 comprises disk identification information and a version number (e.g., "CDK VERSION XX") which are recorded in ASCII code in the area 32 and comprises two sectors in the mode 1 of a CD-ROM format.

Figure 6:
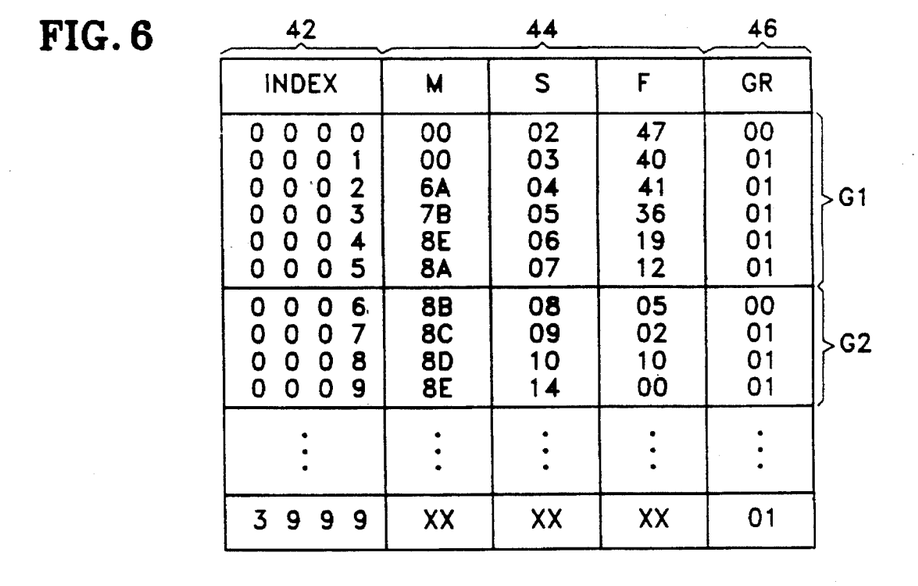
FIG. 6 is a view showing an example of a background image index table recorded on the first table area shown in FIG. 4.

An example of a first table area 34 is illustrated on FIG. 6. The first table area 34 has a starting address B (FIG. 4) and comprises a background image index table which contains indexing information for background image information which is recorded in the first data area 38. The background image index table contains index numbers 42, starting addresses 44, and characteristic information 46 for each background information.

The index number 42 of each background image is represented by two bytes of information which sequentially represents a number from 0000 to 3999. The starting address 44 of each image within the program area (PMA) is represented by three bytes. In particular, the three bytes respectively represent the minute (M), second (S), and frame (F) location of each background image stored in the program area (PMA). The characteristic information 46 of each background image is represented by one byte of information and indicates the group in which each particular background image is classified. For example, background images having similar images (i.e. mountain images, seascape images, skyline images, etc.) may be grouped together. If the characteristic information 46 contains the number "00h", the corresponding background image is the first image of a group of images. Alternatively, if the characteristic information 46 contains the number "01h", the corresponding background image is a continuing image of the image group.

The space needed on the CDK disk to store the background image index table is roughly twelve sectors, assuming a mode 1 disk format. In particular, each listing of the index table contains six bytes of information (i.e. two bytes for the index number 42, three bytes for the starting address 44, and one byte for the characteristic information 46). Thus, in order to store an index listing for each of the 4,000 still images, 24,000 bytes are required (i.e. 4,000 images×6 bytes/image). Since each sector of the CDK disk can store 2048 bytes of information, approximately 12 sectors are required (i.e. 24,000 bytes×1 sector/2048 bytes=11.72 sectors≈12 sectors).

The first data area 38 of the program area (PMA) has a starting address D and contains information relating to the background images. The information relating to the background images are recorded in the first data area 38 in the following order. The background images are recorded according to index number 42 from left to right in a tree structure from the innermost circumference of the disk to the outermost circumference of the disk. Moreover, the images are recorded in such a manner that the tree structure is formed from a higher digit of each index number 42 to a lower digit of each index number 42.

Figure 7:
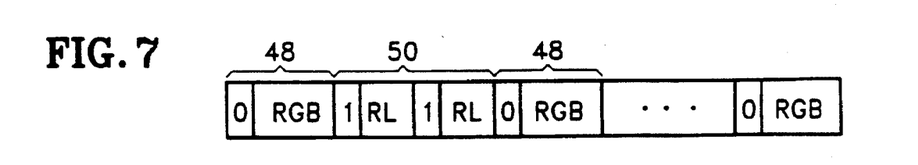
FIG. 7 is a view for explaining a method for compressing background image information recorded on the first data area shown in FIG. 4.

FIG. 7 illustrates the format in which each background image is stored in the first data area 38. In particular, each background image comprises 360 dots×240 lines of information which is compressed into two-byte pixel data 48 and a series of two-byte run-length data 50. Each two-byte pixel data 48 comprises a one-bit start bit and a 15-bit RGB555 code, and each two-byte run-length data 50 comprises a one-bit continuation bit and a 15-bit run-length code.

Therefore, the RGB555 coding of the background image information requires 84.37 sectors ((360×240×2)/2048). However, the run-length coding of the background image information requires about forty sectors if the background image is a natural image and about five sectors if a background image is a graphics image. Accordingly, in order to record 4,000 natural images, roughly 400 megabytes are required.

Figure 8:
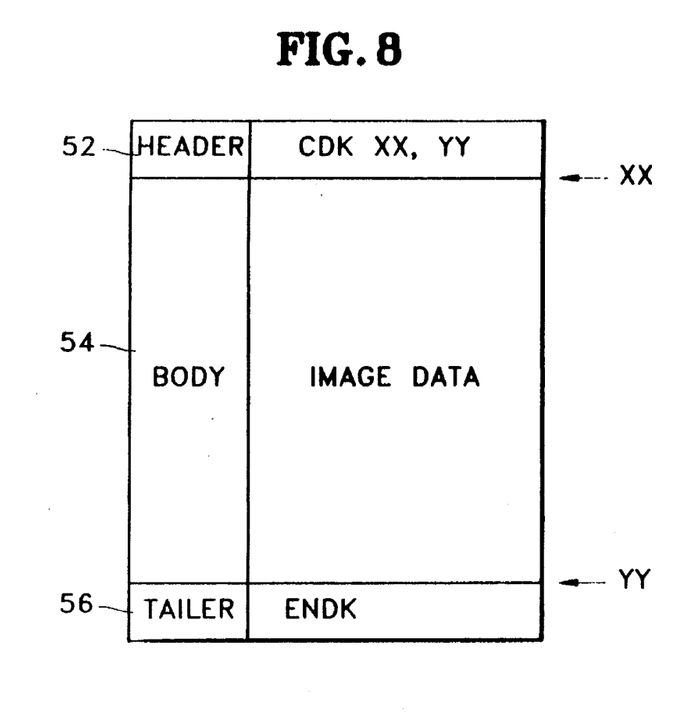
FIG. 8 is a view showing a CDK format of the background image information recorded on the first data area shown in FIG. 4.

FIG. 8 illustrates the format for storing each background image information in the first data area 38. As shown in the figure, each background image comprises a header 52, a body 54, and a tailer 56. The header 52 contains a CDK sign, a pointer XX, and a pointer YY. The pointer XX indicates the starting position of body 54, and the pointer YY indicates the starting position of tailer 56. The body 54 contains compressed data relating to the actual background image, and the tailer 56 contains information indicating the end of each image.

Figure 9:
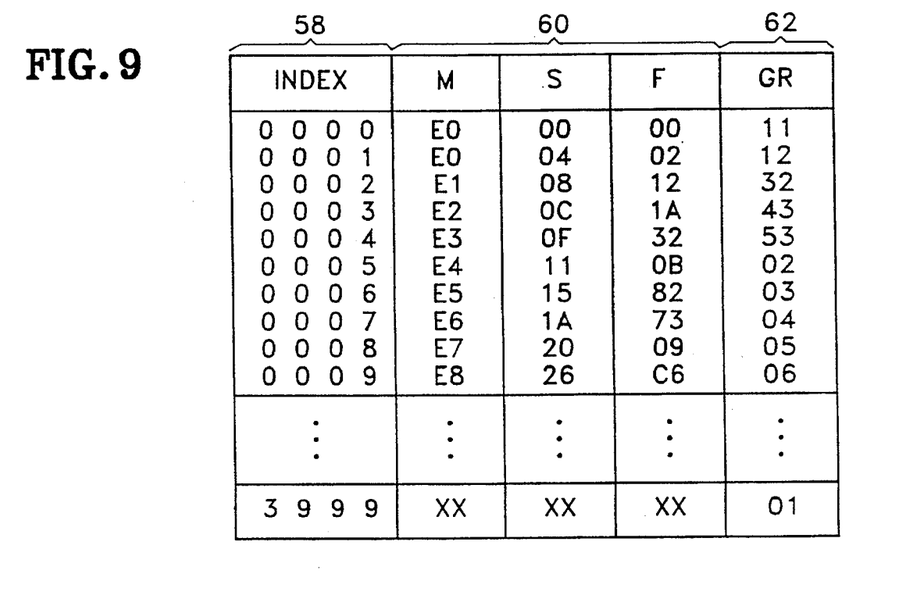
FIG. 9 is view showing an example of the music index table of the second table area shown in FIG. 4.

An example of the second table area 36 is illustrated in FIG. 9. The second table area 36 has a starting address C (FIG. 4) and comprises a music index table which contains indexing information for musical programs which are recorded in the second data area 40. The music index table contains index numbers 58, starting addresses 60, and characteristic information 62 for each musical program.

The index number 58 of each musical program is represented by two bytes of information which sequentially represents a number from 0000 to 3999. The starting address 60 of each musical program stored in the program area (PMA) is represented by three bytes. In particular, the three bytes respectively represent the minute (M), second (S), and frame (F) location of each musical program stored in the program area (PMA). The characteristic information 62 of each background image is represented by one byte of information and indicates the group in which each particular musical program is classified.

Figure 10:
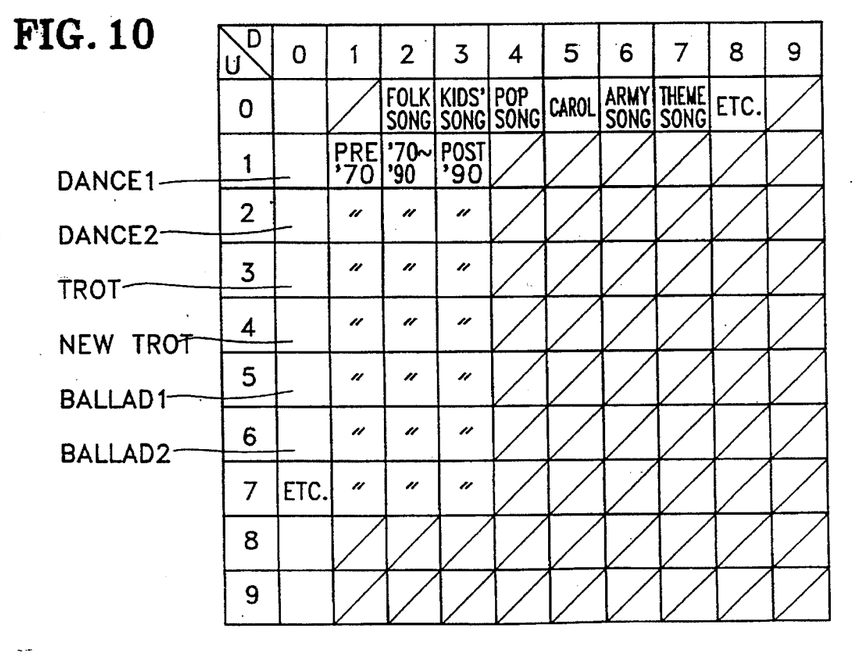
FIG. 10 is a view showing a preferred example of characteristic information of the music index table shown in FIG. 9.

An example of the classification system represented by the characteristic information 62 is shown in FIG. 10. For instance, if the upper four bits of the byte of characteristic information 62 relating to a particular musical program contain the decimal number "0" the musical program is not a popular song. On the other hand, the upper four bits of the byte of character information 62 indicate the rhythm of the particular musical program if they contain the decimal number "1" to "7".

The lower four bits are also expressed in binary-coded decimal form. If the upper four bits contain the decimal number "0", the lower four bits represent the genre of a particular musical program if they contain the decimal number "2" to "8". On the other hand, if the upper four bits do not contain the decimal number "0", the lower four digits indicate the time period in which the musical program was produced.

The size of the music index table stored in the second table area 36 is similar to the size of background image index table stored in the first table area 34. Therefore, the second table area 36 occupies roughly twelve sectors of a CDK disk having a mode 1 format.

The second data area 40 of the program area (PMA) has a starting address E and contains the data relating to the musical programs. The musical programs are recorded in the second data area 40 in a manner similar to the recording of the background images. Specifically, the musical programs are recorded according to their index numbers 58 from left to right in a tree structure from the innermost circumference of the disk to the outermost circumference of the disk. Moreover, the musical programs are recorded in such a manner that the tree structure is formed from a higher digit of each index number 58 to a lower digit of each index number 58.

Figure 11:
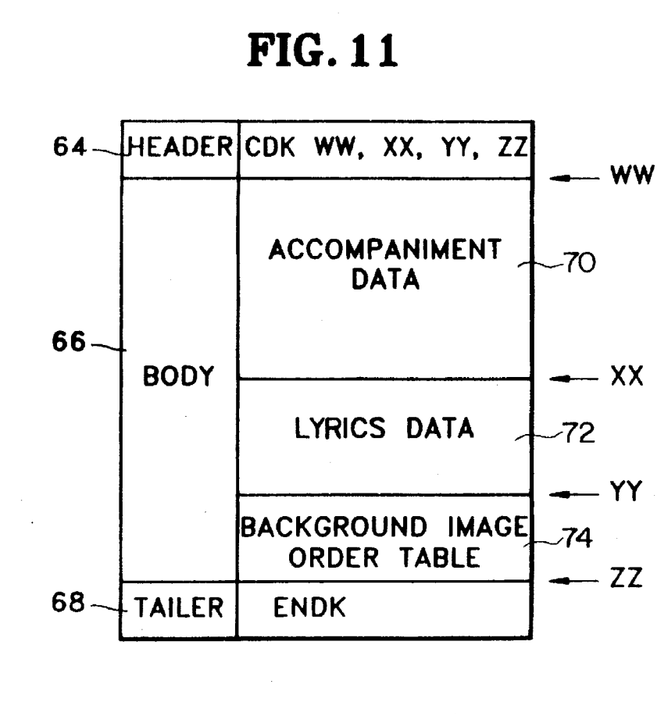
FIG. 11 is a view showing a CDK format of music information recorded on the second data area shown in FIG. 4.

The format in which each musical program is stored in the second data area 40 is illustrated in FIG. 11. In particular, each musical program comprises a header 64, a body 66, and a tailer 68. The body 66 of each musical program contains accompaniment data 70, lyrics data 72, and a background image order table 74. The accompaniment data section 70 contains the audio data for the musical program. The lyrics data section 72 contains the song lyrics for the musical program. In addition, the background image order table 74 contains background image information relating to a predetermined order in which background images of a corresponding musical program will be displayed when the audio data is output. For example, the background image group information may be edited to produce images suitable for the mood and theme of the corresponding musical program.

The header 64 contains CDK disk identification information, a pointer WW, a pointer XX, a pointer YY, and a pointer ZZ. The pointer WW indicates the start of body 66 and accompaniment data section 70. The pointer XX indicates the start of lyrics data section 72. The pointer YY indicates the start of background image order table 74. Finally, the pointer ZZ designating the start of tailer 68.

A recording method for a compact disk having the above-described signal format is described below. First, a plurality of programs including background image information or music information are sequentially assigned predetermined index numbers of an index table. Subsequently, the starting addresses of each of the programs recorded in the program area are stored in the index table according the respective index numbers of each of the programs. Each of the entries of the index table is then written at the innermost circumference of the disk according to the order of predetermined index number.

Subsequently, the plurality of programs are rearranged such that each program is recorded according to their index numbers from left to right in a tree structure from the innermost circumference of the disk to the outermost circumference of the disk. Moreover, the programs are recorded in such a manner that the tree structure is formed from a higher digit of each index number to a lower digit of each index number.

For example, assuming that 3,999 programs are recorded on the disk, the first index number is chosen from the nine numbers 1 to 9 such that the tree structure contains nine main nodes. Each main node in turn has ten first subnodes comprising the numbers 0 to 9, and each of the ten subnodes has ten second subnodes comprising the numbers 0 to 9.

By forming the tree in this manner, if a certain index number has four digits, the tree structure has up to four steps when the programs are recorded from left to right in the tree structure. The specific order in which each of the 3,999 programs are recorded on the disk is as follows.

0001 of the main node,
    0010 of the first subnode,
        0100 of the second subnode,
            1000–1009 of the third subnode,
        0101 of the second subnode,
            1010–1019 of the third subnode,
        0102 of the second subnode,
            1020–1029 of the third subnode,
        . . .
        0109 of the second subnode,
            1090–1099 of the third subnode,
    0011 of the first subnode,
        0110 of the second subnode,
            1100–1109 of the third subnode,
        0111 of the second subnode,
            1110–1119 of the third subnode,
        0112 of the second subnode,
            1120–1129 of the third subnode,
        . . .
        0119 of the second subnode,
            1190–1199 of the third subnode,
    0012 of the first subnode,
        0120 of the second subnode,
            1200–1209 of the third subnode,
        0121 of the second subnode,
            1210–1219 of third subnode,
        0122 of the second subnode,
            1220–1229 of the third subnode,
        . . .
        0129 of the second subnode,
            1290–1299 of the third subnode,
    . . .
    0019 of the first subnode,
        0190 of the second subnode,
            1900–1909 of the third subnode,
        0191 of the second subnode,
            1910–1919 of the third subnode,
        0192 of the second subnode,
            1920–1929 of the third subnode,
        . . .
        0199 of the second subnode,
            1990–1999 of the third subnode,
. . .
0002 of the main node,
    0020 of the first subnode,
        0200 of the second subnode,
            2000–2009 of the third subnode,
        0201 of the second subnode,
            2010–2019 of the third subnode,
        0202 of the second subnode,
            2020–2029 of the third subnode,
        . . .
        0209 of the second subnode,
            2090–2099 of the third subnode,
    0021 of the first subnode,
        0210 of the second subnode,
            2100–2109 of the third subnode,
        0211 of the second subnode,
            2110–2119 of the third subnode,
        0212 of the second subnode,
            2120–2129 of the third subnode,
        . . .
        0219 of the second subnode,
            2190–2199 of the third subnode,
    0022 of the first subnode,
        0220 of the second subnode,
            2200–2209 of the third subnode,
        0221 of the second subnode,
            2210–2219 of the third subnode,
        0222 of the second subnode,
            2220–2229 of the third subnode,
        . . .
        0229 of the second subnode,
            2290–2299 of the third subnode,
    . . .
    0029 of the first subnode, 0290 of the second subnode,
    2900–2909 of the third subnode,
0291 of the second subnode,
    2910–2919 of the third subnode,
0292 of the second subnode,
    2920–2929 of the third subnode,
. . .
0299 of the second subnode,
    2990–2999 of the third subnode,
. . .
0003 of the main node,
  0030 of the first subnode,
    0300 of the second subnode,
      3000–3009 of the third subnode,
    0301 of the second subnode,
      3010–3019 of the third subnode,
    0302 of the second subnode,
      3020–3029 of the third subnode,
. . .
    0309 of the second subnode,
      3090–3099 of the third subnode,
  0031 of the first subnode,
    0310 of the second subnode,
      3100–3109 of the third subnode,
    0311 of the second subnode,
      3110–3119 of the third subnode,
    0312 of the second subnode,
      3120–3129 of the third subnode,
. . .
    0319 of the second subnode,
      3190–3199 of the third subnode,
  0032 of the first subnode,
    0320 of the second subnode,
      3200–3209 of the third subnode,
    0321 of the second subnode,
      3210–3219 of the third subnode,
    0322 of the second subnode,
      3220–3229 of the third subnode,
. . .
    0329 of the second subnode,
      3290–3299 of the third subnode,
. . .
  0039 of the first subnode,
    0390 of the second subnode,
      3900–3909 of the third subnode,
    0391 of the second subnode,
      3910–3919 of the third subnode,
    0392 of the second subnode,
      3920–3929 of the third subnode,
. . .
    0399 of the second subnode,
      3990–3999 of the third subnode,
. . .
0004 of the main node,
  0040 of the first subnode,
    0400–0409 of the second subnode,
  0041 of the first subnode,
    0410–0419 of the second subnode,
  0042 of the first subnode,
    0420–0429 of the second subnode,
. . .
  0049 of the first subnode,
    0490–0499 of the second subnode,
0005 of the main node,
  0050 of the first subnode,
    0500–0509 of the second subnode,
  0051 of the first subnode,
    0510–0519 of the second subnode,
  0052 of the first subnode,
    0520–0529 of the second subnode,
. . .
  0059 of the first subnode,
    0590–0599 of the second subnode,
0006 of the main node,
  0060 of the first subnode,
    0600–0609 of the second subnode,
  0061 of the first subnode,
    0610–0619 of the second subnode,
  0062 of the first subnode,
    0620–0629 of the second subnode, . . .
  0069 of the first subnode,
    0690–0699 of the second subnode,
0007 of the main node,
  0070 of the first subnode,
    0700–0709 of the second subnode,
  0071 of the first subnode,
    0710–0719 of the second subnode,
  0072 of the first subnode,
    0720–0729 of the second subnode,
. . .
  0079 of the first subnode,
    0790–0799 of the second subnode,
0008 of the main node,
  0080 of the first subnode,
    0800–0809 of the second subnode,
  0081 of the first subnode,
    0810–0819 of the second subnode,
  0082 of the first subnode,
    0820–0829 of the second subnode,
. . .
  0089 of the first subnode,
    0890–0899 of the second subnode,
0009 of the main node,
  0090 of the first subnode,
    0900–0909 of the second subnode,
  0091 of the first subnode,
    0910–0919 of the second subnode,
  0092 of the first subnode,
    0920–0929 of the second subnode,
. . .
  0099 of the first subnode, and
    0990–0999 of the second subnode.

As described above, the present invention records programs in a tree structure formed according to the index number of each song. As a result, when a user selects a particular musical program by inputting its corresponding input number, the distance through which an optical pickup must move is relatively large when the first digit is input. However, as the subsequent digits of the index number are input, the distance that the optical pickup moves after each input incrementally decreases as the number of digits input increases. Thus, since the inertia applied to the optical pickup decreases to a minimum as the last digit is input, an accurate search can be performed more rapidly. Consequently, the searching speed of the CD player can be increased and the servo control characteristics can be improved.

As a number of digits of the index numbers increases, the servo control of the CD player is more accurate. Specifically, if the index number is below 100, the target position can be searched by just one to three search operations. On the other hand, if the index number is above 100, four search operations must be performed to locate the target position. Therefore, the searching frequency for a program having an index number below 100 is less than the searching frequency of a program having an index number above 1,000. However, since the distance which the optical head must move decreases as the number of digits of the index number increases, the time required to position the optical head likewise decreases as subsequent digits of the index number are input. Thus, regardless of the magnitude of the index number, a constant average search speed can be maintained.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art.

What is claimed is:

1. A method for reproducing a program selected from a plurality of programs recorded on a compact disk, wherein an index table having index numbers and starting addresses corresponding to said plurality of programs is also recorded on said compact disk, the method comprising the steps of:

inputting an input number;

creating a temporary index number by combining said input number and previously input numbers;

reading said index table to obtain a starting address of a program which corresponds to said temporary index number;

reading said program corresponding to said temporary index number;

storing said program in a temporary memory; and repeating the steps of inputting an input number, creating a temporary index number, reading said index table, reading said program, and storing said program until a reproduction command is input.

2. A compact disk on which a plurality of programs are recorded, said compact disk comprising:

a lead-in area on which table-of-content information is recorded, wherein said table-of-content information comprises information of a plurality of recording tracks and address information of each of said recording tracks; and a program area on which index-table information is recorded on an innermost circumference of said program area, wherein said index-table information comprises index numbers and starting addresses of a plurality of programs recorded in said program area and wherein said plurality of programs are sequentially recorded in a direction from said innermost circumference to an outermost circumference of said program area in a tree structure based on said index numbers of said plurality of programs.

3. A method of recording a plurality of programs on a compact disk to enable high-speed searching of said plurality of programs, the method comprising the steps of:

respectively assigning index numbers to said plurality of programs;

arranging said index numbers in a tree structure;

rearranging said plurality of programs into rearranged programs, wherein said rearranged programs are rearranged according to an order of searching said tree structure;

obtaining starting addresses for said rearranged programs;

creating an index table using said starting addresses and said index numbers of said rearranged programs; and recording said index table and said rearranged programs sequentially from an innermost circumference to an outermost circumference on a program area of said compact disk.

4. The method for reproducing a selected program as claimed in claim 1, further comprising the step of:

reproducing said program stored in said temporary memory as a selected program when said reproduction command is input.

5. A method for reproducing a selected program of a plurality of programs recorded on a compact disk, wherein an index table having index numbers and starting addresses corresponding to said plurality of programs is also recorded on said compact disk, the method comprising the steps of:

inputting a first input number via an input device;

creating a first temporary index number by using said first input number as a first digit of said first temporary index number;

referencing said first temporary index number in said index table recorded on said compact disk;

reading a first temporary program of said plurality of programs from said compact disk, wherein said first temporary program corresponds to said first temporary index number located in said index table;

storing said first temporary program reproduced from said compact disk in a temporary memory;

inputting a second input number via said input device;

creating a second temporary index number by using said first input number as a first digit of said second temporary index number and using said second input number as a second digit of said second temporary index number;

referencing said second temporary index number in said index table recorded on said compact disk;

reading a second temporary program of said plurality of programs from said compact disk, wherein said second temporary program corresponds to said second temporary index number located in said index table;

storing said second temporary program reproduced from said compact disk in said temporary memory;

inputting a reproduction command from said input device; and reproducing said second temporary program from said temporary memory as said selected program when said reproduction command is input.

6. The method for reproducing a selected program as claimed in claim 5, wherein said first digit is a greater significant digit of said second temporary index number than said second digit.

7. The method for reproducing a selected program as claimed in claim 1, wherein said input number is a lower significant digit of said temporary index number than said any other previously input numbers.

8. The compact disk as claimed in claim 2, wherein each of a plurality of first potential values of a least significant digit of said index numbers form a main node in said tree structure, and wherein each of a plurality of second potential values of a second least significant digit of said index numbers form a first subnode in said tree structure.

9. The compact disk as claimed in claim 8, wherein each of a plurality of third potential values of a third least significant digit of said index numbers form a second subnode node in said tree structure.

10. The compact disk as claimed in claim 8, wherein said plurality of first potential values equals the numbers one through nine and said plurality of second potential values equals the numbers zero through nine.

11. The compact disk as claimed in claim 3, wherein each of a plurality of first potential values of a least significant digit of said index numbers form a main node in said tree structure, and wherein each of a plurality of second potential values of a second least significant digit of said index numbers form a first subnode in said tree structure.

12. The compact disk as claimed in claim 11, wherein each of a plurality of third potential values of a third least significant digit of said index numbers form a second subnode node in said tree structure.

13. The compact disk as claimed in claim 11, wherein said plurality of first potential values equals the numbers one through nine and said plurality of second potential values equals the numbers zero through nine.

* * * * *